United States Patent [19]

Fuertes et al.

[11] Patent Number: 5,756,484
[45] Date of Patent: May 26, 1998

[54] PULVERULENT HYDROXYPROPYL-β-CYCLODEXTRIN COMPOSITION AND PROCESS FOR ITS PREPARATION

[75] Inventors: Patrick Fuertes, Lambersart; Bruno Vappereau, La Gorgue; Michel Serpelloni, Beuvry-les-Bethune; José Lis, La Gorgue, all of France

[73] Assignee: Roquette Freres, Lestrem, France

[21] Appl. No.: 657,338

[22] Filed: Jun. 3, 1996

[30] Foreign Application Priority Data

Jun. 8, 1995 [FR] France ................ 95 06772

[51] Int. Cl.$^6$ .................. A61K 31/715; A61K 9/14; A61K 9/20; C08B 37/16
[52] U.S. Cl. .................. 514/58; 514/54; 514/951; 536/103; 424/464; 424/489
[58] Field of Search ................ 514/54, 58, 951; 536/103; 424/464, 489

[56] References Cited

U.S. PATENT DOCUMENTS

| 4,727,064 | 2/1988 | Pitha ................ 514/58 |
| 4,920,214 | 4/1990 | Friedman ............ 536/103 |
| 5,674,854 | 10/1997 | Bodley et al. ....... 514/58 |
| 5,679,660 | 10/1997 | Bodley et al. ....... 514/58 |

FOREIGN PATENT DOCUMENTS

| 1 222 697 | 6/1987 | Canada . |
| 0 366 154 | 5/1990 | European Pat. Off. . |
| 2 659 970 | 9/1991 | France . |
| 63-079802 | 4/1988 | Japan . |
| 1068303 | 3/1989 | Japan . |
| 95/13864 | 5/1995 | WIPO . |

OTHER PUBLICATIONS

Szejtli, J. Medicinal Research Reviews, vol. 14(3), pp. 353–386, (1994).

Uekama et al. CRC Critical Reviews in Therapeutic Drug Carrier Systems, vol. 3(1), pp. 1–40, (1988).

Chemical abstracts, vol. 93, No. 14, 6 Oct. 1980 Columbus, Ohio, US; abstract No. 134246, *abstract* and JP-A-55 056 801.

"New Trends in Cyclodextrins and Derivatives" edited by Prof. Duchene D. in 1991.

Primary Examiner—John Kight
Assistant Examiner—Howard C. Lee
Attorney, Agent, or Firm—Henderson & Sturm

[57] ABSTRACT

The invention relates to a novel pulverulent hydroxypropyl-β-cyclodextrin compound having a centered particle size free of fine particles and an appreciably improved capacity to dissolve in aqueous medium. The compound also has good flowability and has the advantage of being compressible. The invention also relates to a process for the preparation of this pulverulent hydroxypropyl-β-cyclodextrin compound.

13 Claims, No Drawings

PULVERULENT HYDROXYPROPYL-β-CYCLODEXTRIN COMPOSITION AND PROCESS FOR ITS PREPARATION

The invention relates to a novel pulverulent hydroxypropyl-β-cyclodextrin composition having a specific particle size and an excellent rate of dissolution.

The invention is also directed towards a specific process for obtaining this composition, as well as the industrial uses thereof.

Cyclodextrins, macrocycles containing six, seven or eight glucose units depending on whether it is an α-, β- or γ-cyclodextrin, are widely described in the literature, in particular for their properties of solubilizing and stabilizing various compounds. These properties, essentially due to their capacity to form a complex in the presence of compounds which can be housed, in total or in part, within these macrocycles, find a real advantage in the plant-protection, pharmaceutical and food industries. Cyclodextrin derivatives have themselves also been studied, in particular with the aim of increasing the water solubility of cyclodextrins, which is not very high: indeed, this solubility is only 1.8 g per 100 ml for β-cyclodextrin, for example. Among these derivatives, cyclodextrin ethers, and more particularly hydroxyalkylcyclodextrins, have been the subject of particular attention, on account of their high water solubility, their harmlessness and their ease of manufacture.

These hydroxyalkylcyclodextrins correspond to cyclodextrins in which all or some of the hydroxyl groups are etherified with hydroxyalkyl groups.

The characteristics of these derivatives have incited scientists to test them in various fields, in particular pharmaceutical, cosmetic and plant-protection fields.

Indeed, the good water solubility of these derivatives has a most specific advantage for the development of water-soluble forms of pharmaceutical active principles which are themselves sparingly soluble or insoluble in water, and moreover having high stability.

Thus, U.S. Pat. No. 4,727,064 filed by Pitha protects pharmaceutical compositions containing an amorphous complex of pharmaceutical active agent with a cyclodextrin compound, including in particular hydroxypropyl-β-cyclodextrin. This complex makes it possible to improve the solubility of the active principle and thus its absorption by the body.

The company Janssen Pharmaceutica has also obtained a European patent EP 149,197 relating to pharmaceutical preparations consisting of inclusion compounds of medicinal products which are difficult to dissolve in water or unstable in water with a partially etherified β-cyclodextrin, and in particular hydroxypropyl-β-cyclodextrin, with the aim of improving the solubility and stability of these medicinal products in water.

A European patent granted to the company Shiseido under No. EP 366,154 protects the use of hydroxypropyl-β-cyclodextrin in a cosmetic product. The complexes obtained with the sparingly water-soluble compounds which are UV screening agents, preserving agents and fragrances have very good water solubility and the cosmetic products containing them possess satisfactory stability without it being necessary to use solubilizing agents which are, moreover, irritant to the skin.

Lastly, it may also be noted that uses of hydroxypropyl-β-cyclodextrin in the plant-protection field have been described, in particular in the Japanese patents from Sun Oil No. 1068303 and Nihon Noyaku No. 63079802. An account is given therein of an advantage with regard to the toxicity of the complexed chemical compound, as well as with regard to the solubility and stability of the complexes.

It will be added that many other references specifically describing complexes of a particular active agent with hydroxypropyl-β-cyclodextrin exist in the literature.

The hydroxyalkyl derivatives of cyclodextrins are generally obtained according to the process which consists in reacting, under specific temperature, pressure and time conditions, propylene oxide with a β-cyclodextrin in aqueous medium and at alkaline pH. Sodium hydroxide is generally chosen as reaction catalyst.

This reaction is generally performed at a temperature of at least 70° C.

At the end of the reaction, the reaction medium is neutralized and the hydroxypropyl-β-cyclodextrin is isolated, purified and recovered in the form of an aqueous solution.

Insofar as a solid form is desired, various techniques have already been used. Thus, in chapter 2, relating to hydroxypropyl-β-cyclodextrins, the book edited by Prof. Duchene in 1991 and entitled "New Trends in Cyclodextrins and Derivatives", L. Szente and C. E. Strattan quote freeze-drying, spraying and evaporation.

Freeze-drying and spraying are also the means suggested by American Maize Products in its French patent No. 2,597,485 in order to recover cyclodextrin ethers.

However, as raised by L. Szente and C. E. Strattan in the reference cited above, the powders obtained according to these various techniques have many faults, and in particular poor dissolution.

In addition, these powders do not flow easily and possess mediocre compression properties.

Moreover, these techniques lead to the production of very fine particles, which constitute a considerable nuisance as regards the operations of filling and emptying of the supply hoppers and chutes, as well as of the packing bags. Furthermore, these fine particles may be the cause of explosions and also represent a potential source of irritation for the handler.

On the strength of this analysis, the Applicant Company has thus sought to develop a pulverulent hydroxypropyl-β-cyclodextrin composition whose rate of dissolution is high and which is more compatible with all the industrial requirements, having none of the flow and compression faults of the known powder forms of hydroxypropyl-β-cyclodextrin, and at the same time not being a source of dust or of explosions in the production plants.

The applicants have succeeded in preparing a pulverulent hydroxypropyl-β-cyclodextrin composition which is free of the faults mentioned above, simultaneously having a "centered" particle size free of fine particles and a considerably improved capacity to dissolve in aqueous medium.

The invention thus relates to a pulverulent hydroxypropyl-β-cyclodextrin composition, characterized in that it has less than about 25% of particles smaller than 100 microns in size and whose rate of dissolution in aqueous medium, measured according to a test I, is less than 5 minutes at 21° C. for a solution with a solids content of 20% by weight.

The invention also relates to a process for the preparation of a pulverulent hydroxypropyl-β-cyclodextrin composition possessing the physical and functional characteristics outlined above.

According to the first essential characteristic of the pulverulent hydroxypropyl-β-cyclodextrin composition according to the invention, which will be referred to hereinbelow more simply as HPβCD, the latter has a specific and centred particle size. Indeed, it contains less than about 25% of particles smaller than 100 microns in size.

Preferably, the pulverulent HPβCD composition contains not more than about 10% of particles smaller than 40 microns in size and, even more preferably, it contains less than about 40% of particles larger than 315 microns in size.

As regards the absence of very fine particles, which represents a specific advantage characteristic of the compositions according to the invention, this has been demonstrated using the Dustmeter machine (configuration No. II), marketed by the company Henbach Engineering. The principle of the measurement lies in placing the test product in motion in a rotating barrel; the fine particles present are then carried away by a current of air, then collected on a filter. The weight of this filter, before and after the placing in motion, gives the amount of fine particles accumulated on the filter.

In the case of the pulverulent HPβCD composition according to the invention, the amount of powder used is 100 grams, the air flowrate is 8 liters per minute and the period of placing in motion is 5 minutes. The results obtained clearly demonstrate the negligible amount of fine particles present in the compositions according to the invention when compared with a composition according to the prior art.

The second essential characteristic of the pulverulent HPβCD composition according to the invention consists of its ability to dissolve very rapidly.

Thus, the dissolution time measured under the conditions of test I which will be described later is less than 5 minutes, preferably less than 3 minutes, and even more preferably less than 2 minutes, at a temperature of 21° C. and for an HPβCD solution with a solids content of 20% by weight, which constitutes a considerable improvement relative to the rate of dissolution of the known HPβCD powders. Moreover, this improvement is particularly appreciable insofar as a rapid rate of dissolution conditions an even wider use of the HPβCD.

In order to measure the rate of dissolution, which thus constitutes the second essential characteristic of the pulverulent HPβCD composition in accordance with the invention, the process is performed according to test I, which consists in measuring the time required for complete solubilization in demineralized water of different amounts of HPβCD corresponding to compositions with a solids content of 5, 10, 20, 30 and 40%. For this measurement, the amount of demineralized water required to obtain at the end 100 g of composition having an HPβCD content of 5, 10, 20, 30 or 40% by weight is introduced into a tall 150 ml beaker, the solution is then stirred at 1250 revolutions/minute with a magnetic bar (length: 25 mm, diameter: 6 mm) and the selected amount of HPβCD is added. This test is performed at two temperatures: 21° C. and 60° C.

The dissolution time selected is that corresponding to perfect visual clarity being reached in the suspensions thus prepared.

Whether this is at room temperature or at an elevated temperature and irrespective of the HPβCD concentration, the dissolution times of the pulverulent compositions according to the invention are always markedly shorter than those of the compositions according to the prior art.

In addition, it is noted that with the compositions according to the prior art, an accumulation of powder at the surface occurs in the case of the higher solids contents, this accumulation possibly being followed by overflowing. This problem has necessitated the portionwise addition of HPβCD.

Besides the dissolution time, the Applicant has moreover demonstrated other particularly advantageous functional characteristics of the composition according to the invention, such as its flowability and its compressibility.

The flowability was evaluated with the machine marketed by the company Hosokawa. This machine makes it possible to measure, under standardized and reproducible conditions, the flowability of a powder and to calculate a flow grade, also referred to as the Carr number. The pulverulent HPβCD composition in accordance with the invention has an excellent flow grade, of between 60 and 90. This grade will preferably be between 70 and 85. The flow of the powders according to the invention is thus seen to be markedly better than that of the powders of the prior art.

This characteristic is particularly advantageous in industrial practice, since it facilitates the operations of filling and emptying of the hoppers and containers or alternatively of the pharmaceutical forms such as sachets and gelatin capsules.

With the same machine and according to the method indicated by the manufacturer, the aerated apparent density was measured. The values obtained for the compositions according to the invention are always between 300 and 650 g/l, and preferably 350 to 600 g/l, whereas for the compositions of the prior art, the aerated apparent density is less than 300 g/l.

As regards the compressibility, this is determined by test II, which consists in measuring the force, expressed in newtons (N), required to crush a tablet prepared from the composition to be tested, that is to say the force required to bring about the appearance of rupture lines within the bulk constituting this tablet. This force thus reflects the crush strength of a cylindrical tablet, with convex faces, 13 mm in diameter, 5 mm in thickness and 0.499 g in weight, that is to say having a density of 1.15 g/ml, the said force being exerted against the peripheral surface of the tablet in the direction of the axis of rotation thereof by means of a movable stop applied against the said surface along a generatrix, the said tablet being moreover immobilized against a fixed stop also applied against the peripheral surface of the tablet along a generatrix diametrically opposite that against which the movable stop is applied.

In order to prepare these tablets, 0.5% by weight of lubricant, namely magnesium stearate, is added to the test composition.

These two products are homogenized together using a Turbula T2C mixer (marketed by the company Willy A. Bachofen AG, Switzerland) for 5 minutes at a drive speed of 42 revolutions/minute.

A Frogerais alternating press of AM type is used in order to compress the mixture obtained. This press is fitted with round punches with concave faces of diameter equal to 13 millimeters.

In order to arrive at the abovementioned tablet characteristics, the penetration of the upper punch and the filling volume of the matrix are adjusted, the latter arrangement making it possible to set the desired amount by weight of pulverulent mixture, in this case 0.499 g.

A Schleuniger 2E durometer (marketed in France by Frogerais and Co.) is used in order to evaluate the crush strength of these tablets.

In contrast with the compositions of the prior art, obtained according to the known techniques, with which it was not possible to prepare tablets on account of adhesion and cleavage problems which occurred during the application of pressure, the pulverulent HPβCD compositions according to the invention have an entirely satisfactory compressibility. This is reflected by a hardness of the tablets which will, in all cases, be higher than 30N, preferably higher than 60N, and even more preferably higher than 100N, for a tablet density of 1.15 g/ml.

This compressibility is desired for the preparation of lozenges to be sucked or chewed, either for the pharmaceutical field or for the field of confectionery.

The pulverulent HPβCD compositions in accordance with the invention are capable of being obtained according to a process which has certain similarities to a spraying, under specific conditions, of a solution of hydroxypropyl-β-cyclodextrin, although this technique has not hitherto made it possible to obtain a pulverulent hydroxypropyl-β-cyclodextrin composition having the particle size and functional characteristics of the composition according to the invention. This process consists essentially in spraying a solution of HPβCD on a moving pulverulent bed of HPβCD particles.

In particular, the process used for the production of the compositions according to the invention includes the following steps:

preparation of a solution of HPβCD having a solids content of at least 30% by weight, fine spraying of this solution on a moving pulverulent bed of HPβCD particles, the temperature of this bed being between 40° C. and 110° C. and the mass of this bed constantly representing at least 0.5 times the mass of the solution sprayed per hour, drying of the pulverulent bed and of the solution so as to obtain the pulverulent HPβCD composition, possible partial recycling of the composition so that it constitutes a new pulverulent HPβCD bed.

This technique thus makes it possible to obtain a pulverulent HPβCD composition having a specific and centred particle size, while at the same time having an excellent rate of dissolution. These characteristics, as well as its flowability and compressibility, may be adjusted by modifying the solids content of the HPβCD solution to be sprayed, the fineness of spraying, the means of placing the particles in motion, the bed temperature, the drying temperature and the respective masses of the bed and of the sprayed solution.

As regards the solids content of the HPβCD solution, it is preferred for this to be greater than or equal to 50% by weight.

Moreover, it is preferable to avoid coarse spraying of the solution, otherwise adhesion of the particles is observed.

Thus, in order for the pulverulent HPβCD composition to have the specific properties described above, equipment which makes it possible to form very fine droplets, or even a mist, from the solution should be selected.

As regards the nature of the HPβCD particles constituting the pulverulent bed, the ideal is to select, for this bed, HPβCD particles having all of the characteristics of the pulverulent HPβCD composition in accordance with the invention. This may be obtained by partially recycling the composition in accordance with the invention, which then acts as a pulverulent bed of HPβCD particles.

The particles constituting the pulverulent bed may be placed in motion mechanically or by blowing with air. The latter possibility is preferred since it is easy, by selecting the air temperature, to adjust the bed temperature to a value of between 40° and 110° C.

It is generally preferred for this bed temperature to be maintained between 50° and 80° C.

The pulverulent bed on which the syrup has been sprayed must be dried so as to obtain a final water content not exceeding 5%, and preferably 3%, of the composition.

The Applicant has demonstrated that the pulverulent HPβCD composition could advantageously be manufactured continuously, for example using a spraying tower from the company Niro Atomizer, of the "multiple effect" or M.S.D. type, the latter type being preferred. Such spraying towers make it possible, by virtue of their design, to reproduce all the essential steps of the process in accordance with the invention.

Indeed, this equipment makes it possible to spray very finely, with the aid of its nozzle, a solution having a temperature of between 30° and 100° C. and a solids content of between 30 and 70% by weight, onto a bed of HPβCD particles placed and maintained in motion by air. Furthermore, this equipment makes it possible simultaneously to perform a drying operation by hot air. An inlet air temperature of between 160° and 300° C. and flow rates of material entering may advantageously be chosen such that the air temperature leaving the tower is between 45° and 130° C., and better still between 60° and 90° C. This equipment also makes it possible optionally to perform a partial recycling of the pulverulent HPβCD composition and to disperse it very finely in the tower, preferably around the solution spray nozzle.

On account of its specific properties, the pulverulent HPβCD composition in accordance with the invention may advantageously be used as an agent for improving the solubility and/or stability in water of active compounds in the formulation of powders to be dissolved or of tablets in the pharmaceutical, cosmetic and agrochemical fields.

The advantages of the present invention will be better understood on reading the examples which follow, given by way of illustration and without any limitation whatsoever being implied, based on specific embodiments of the pulverulent HPβCD composition according to the invention.

EXAMPLE

Preparation of three pulverulent HPβCD compositions according to the invention and comparison with a product of the prior art.

An HPβCD solution is prepared according to a standard process, under the following conditions:

1275 g of commercial β-cyclodextrin (corresponding to 1134 g anhydrous) is dissolved in 1600 g of 6% sodium hydroxide solution (96 g of sodium hydroxide in 1504 g of demineralized water), while maintaining a temperature of about 80° C.

The solution is placed in a reactor, under an inert atmosphere of nitrogen, fitted with stirrer and a condenser. 406 g of propylene oxide are introduced dropwise into the reactor while maintaining the temperature at 80°–100° C. and the reaction is continued for 4 hours after the addition of the propylene oxide is complete. The reaction mixture is then cooled and neutralized by addition of concentrated hydrochloric acid.

The reaction mixture is optionally purified, depending on the desired degree of purity, by the known techniques of the prior art (filtration, decolorization by treatment with active charcoal, demineralization, washing with ethanol, extraction with acetone, dialysis).

For each of these three compositions according to the invention, the process is then performed respectively in the following way:

Composition No. 1

The composition is adjusted to 60% by weight solids content and brought to 50° C. before being subjected to spraying in a tower of the "multiple effect" type from the company Niro Atomizer.

This solution is then finely sprayed onto a pulverulent bed of moving particles corresponding to the particles formed at the start of the operation.

The temperature of the bed of moving particles is adjusted to 50° C.

The temperature of the drying air at the upper inlet of the tower is between 175° and 195° C., the temperature of the air leaving the tower being between 45° and 60° C.

Composition No. 2

The solution is adjusted to 35% by weight solids content and brought to 70° C. before being subjected to spraying in a tower of the M.S.D. type from the company Niro Atomizer.

The temperature of the bed of moving particles is adjusted to 75° C.

The temperature of the drying air at the upper inlet of the tower is between 200° and 230° C., the temperature of the air leaving the tower being between 65° and 85° C.

Composition No. 3

The solution is adjusted to 55% and brought to 70° C. before being subjected to spraying in a tower of the M.S.D. type from the company Niro Atomizer.

The temperature of the bed of moving particles is adjusted to 62° C.

The temperature of the drying air at the upper inlet of the tower is between 180° C. and 200° C., the temperature of the air leaving the tower being between 60° and 80° C.

Composition According to the Prior Art

This composition is obtained according to a standard spraying technique, which consists of simple spraying of an HPβCD solution with a solids content of 35% by weight in a standard spraying tower, in the absence of any pulverulent bed of HPβCD particles.

The temperature of the drying air at the tower inlet is between 230° and 280° C., the temperature of the air leaving being between 100° and 130° C.

The main physical and functional characteristics of compositions No. 1, No. 2 and No. 3 obtained under the conditions described above are given in the following table.

TABLE

| | Compositions according to the invention | | | | | | | | Composition according to the prior art | |
|---|---|---|---|---|---|---|---|---|---|---|
| | No. 1 | | No. 2 | | No. 3 | | | | | |
| Particle size | | | | | | | | | | |
| <40 μ | 0% | | 0% | | 0% | | | | 50% | |
| <100 μ | 9% | | 21% | | 1% | | | | 100% | |
| >315 μ | 25% | | 6% | | 11% | | | | 0% | |
| Aerated apparent density in g/l | 478 | | 386 | | 381 | | | | 263 | |
| Dissolution time | at 21° C. | at 60° C. | at 21° C. | at 60° C. | at 21° C. | at 60° C. | | | at 21° C. | at 60° C. |
| 5% solution | 0 min15 | <10 s | 0 min15 | <10 s | 0 min15 | <10 s | | | 1 min15 | 0 min40 |
| 10% solution | 0 min35 | 0 min10 | 0 min30 | 0 min10 | 0 min35 | 0 min10 | | | 4 min | 1 min10 |
| 20% solution | 0 min50 | 0 min15 | 0 min45 | 0 min20 | 0 min50 | 0 min20 | | | 8 min* | 4 min |
| 30% solution | 2 min15 | 0 min35 | 1 min10 | 0 min35 | 1 min15 | 0 min35 | | | 11 min* | 6 min15* |
| 40% solution | 4 min | 1 min10 | 2 min30 | 1 min10 | 2 min40 | 1 min10 | | | 17 min* | 8 min50* |
| Dust content in g | 0.15 | | 0.03 | | 0.03 | | | | 0.64 | |
| Flow grade | 77 | | 76 | | 78 | | | | 44 | |
| Compressibility | 34 N | | 147 N | | 116 N | | | | Impossible to compress | |

*Portionwise addition of the HPβCD required

In contrast with the composition of the prior art, the compositions in accordance with the invention advantageously combine properties which, until now, had never been found simultaneously. Indeed, they possess, at the same time, characteristics of dissolving very rapidly in water, of being compressible, of flowing easily and of not generating very fine particles.

We claim:

1. Pulverulent hydroxypropyl-β-cyclodextrin compound, containing less than about 25% of particles smaller than 100 microns in size and having a dissolution time in aqueous medium, measured according to a Test I, of less than 5 minutes at 21° C. for a solution with a solids content of 20% by weight, said Test I consisting of introducing a solution of the HPβCD into a tall beaker, stirring the solution at 1250 revolutions/minute until perfect visual clarity of the solution is reached.

2. The pulverulent hydroxypropyl-β-cyclodextrin compound according to claim 1, wherein the dissolution time, measured according to Test I, is less than 3 minutes.

3. The pulverulent hydroxypropyl-β-cyclodextrin compound according to claim 1, wherein the dissolution time, measured according to Test I, is less than 2 minutes.

4. The compound according to claim 1, not containing more than about 10% of particles smaller than 40 microns in size.

5. The compound according to claim 1, containing less than about 40% of particles larger than 315 microns in size.

6. The compound according to claim 1, having a flow grade of between 60 and 90.

7. The compound according to claim 1, having a flow grade of between 70 and 85.

8. The compound according to claim 1, having an aerated apparent density of between 300 and 650 g/l.

9. The compound according to claim 1, having an aerated apparent density of between 350 and 600 g/l.

10. The compound according to claim 1, having a compressibility, determined according to a Test II, of greater than 30N.

11. The compound according to claim 1, having a compressibility, determined according to a Test II, of greater than 60N.

12. The compound according to claim 1, having a compressibility, determined according to a Test II, of greater than 100N.

13. A process for the production of a pulverulent HPβCD compound according to claim 1, comprising:

preparing a solution of HPβCD having a solids content of at least 30% by weight, fine spraying of this solution on a moving pulverulent bed of HPβCD particles, the temperature of this bed being between 40° C. and 110° C. and the mass of this bed constantly representing at least 0.5 times the mass of the solution sprayed per hour, drying of the pulverulent bed and of the solution so as to obtain the pulverulent HPβCD compound, optionally recycling a portion of the pulverulent HPβCD compound in order to reconstitute a new pulverulent HPβCD bed.

* * * * *